(12) United States Patent
Todd

(10) Patent No.: US 6,760,049 B1
(45) Date of Patent: Jul. 6, 2004

(54) POINTER MEMORY FOR IMPROVED SELECTION ACCURACY

(75) Inventor: Stephen James Paul Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 09/585,652

(22) Filed: Jun. 1, 2000

(30) Foreign Application Priority Data

Jul. 14, 1999 (GB) ............................................. 9916518

(51) Int. Cl.[7] ................................................. G09G 5/00
(52) U.S. Cl. ..................................... 345/813; 345/860
(58) Field of Search ................................ 345/812, 754, 345/813–814, 822, 856–861, 862

(56) References Cited

U.S. PATENT DOCUMENTS

| | | | | |
|---|---|---|---|---|
| 5,287,102 A | * | 2/1994 | McKiel, Jr. ............ | 340/825.19 |
| 5,555,363 A | * | 9/1996 | Tou et al. ................... | 345/863 |
| 5,808,604 A | * | 9/1998 | Robin ........................ | 345/856 |
| 5,884,306 A | * | 3/1999 | Bliss et al. ................. | 345/821 |
| 6,075,531 A | * | 6/2000 | DeStefano .................. | 345/788 |
| 6,111,562 A | * | 8/2000 | Downs et al. .............. | 345/727 |
| 6,246,411 B1 | * | 6/2001 | Strauss ....................... | 123/162 |

FOREIGN PATENT DOCUMENTS

WO    WO9630822    10/1996

* cited by examiner

*Primary Examiner*—Kristine Kincaid
*Assistant Examiner*—Le Nguyen
(74) *Attorney, Agent, or Firm*—Louis J. Percello; F.Chau & Associates, LLP

(57) ABSTRACT

An improved graphics system for a graphical user interface in which a plurality of screen objects are displayed is disclosed. Conventional systems comprises targeting means for determining a screen object targeted by the pointer; and selection means for reading a pointer selection and for selecting a screen object. The invention is characterized by the selection means comprising means for selecting a screen object which has been continuously targeted for a predetermined time (pi).

9 Claims, 3 Drawing Sheets

POINTER MEMORY FOR IMPROVED SELECTION ACCURACY

BACKGROUND OF THE INVENTION

1. Field of the Invention

The present invention relates to a graphics system for providing improved pointer selection accuracy.

2. Description of Prior Art

When selecting an object with a mouse or other pointing device users commonly nudge the pointer while depressing the selection button. This can cause a failure to selection the intended object, or alternatively, inadvertent selection of an object adjacent to the intended object. For example, in FIG. 1, a user who positions a pointer on Object X may inadvertently cause the pointer to move onto Object Y just before clicking the selection button.

This can be a particular problem for partially disabled users or users not accustomed to mice, when selecting small or thin objects. It can also arise in a cluttered environment, or in the presence of unexpectedly selectable objects. A similar problem arises when selecting a moving target.

SUMMARY OF THE INVENTION

The present invention relates to a graphics system which remembers the object which the pointer has been pointing at in the recent past.

In a preferred embodiment, an object may be selected even if the pointer is no longer pointing at that object when the selection event is registered. In this case two threshold intervals are used, a pause interval (pi), and a nudge interval (ni). The pause interval prevents incorrect selection, and the nudge interval permits selection even if the pointer is nudged during selection.

In an alternative embodiment, the selection is only successful if the pointer has consistently been pointing at the same object for more than the threshold pause interval (pi) when the selection (e.g., mouse down) event is registered. This prevents selection of the incorrect adjacent object, but does not assist selection of the correct object. Thus, the second mode is a special case of the first mode, with ni=0.

Typical values are pi=0.3 seconds and ni=0.1 second for an uncertain user, pi=0.15 seconds and ni=0.05 seconds for a more experienced user. It will be seen that ni<pi as otherwise there may be a possibility of an ambiguity in the object to be selected.

In yet another embodiment of the present invention, a graphics system for a graphical user interface (GUI) is disclosed in which screen objects are displayed. The GUI includes targeting means for determining a screen object targeted by the pointer, and selection means for reading a pointer selection and for selecting a screen object.

The graphics system can be characterized by a selection means including means for selecting a screen object which has been continuously targeted for a predetermined time (pi).

Preferably, the targeting means includes means for recording a time at which a screen object becomes targeted. The targeting means also includes means for reading a pointer position before determining which object is targeted.

According to one embodiment of the present invention, the selection means includes means for selecting a screen object which has been continuously targeted for the predetermined time (pi) and for a predetermined time (ni) after it ceases to be targeted. In one embodiment, the predetermined times ni and pi are stored within the graphics system.

According to another embodiment of the present invention, a control panel is associated with the graphics system. The control panel is responsive to user interaction and updating the predetermined times ni and pi according to the interaction. The predetermined time pi is greater than the predetermined time ni.

According to one embodiment of the present invention, the graphics system is embodied in an operating system. Alternatively, the graphics system is embodied in an application wherein the application is one of a general purpose application or a dedicated application.

Further, in another embodiment of the present invention, a computer program product including computer program code stored on a computer readable storage medium for, when executed on a computing device, controls the selection of screen objects, the program code including the graphical system.

In an alternative embodiment of the present invention, a graphics system for a graphical user interface is presented. In this embodiment screen objects are displayed, and a method for selecting a screen object includes determining the screen object targeted by the pointer, and selecting the screen object which has been continuously targeted for a predetermined time (pi), and is responsive to a pointer selection.

BRIEF DESCRIPTION OF THE DRAWINGS

Preferred embodiments of the present invention will be described below in more detail with reference to the accompanying drawings:

FIGS. 3(a) to 3(c) show examples of state transitions for a pointer according to an embodiment of the invention.

DETAILED DESCRIPTION OF THE PREFERRED EMBODIMENTS

The embodiments of the present invention will be described in object oriented terms, nonetheless, the invention is not limited to this method of programming.

In Microsoft® operating systems, such as Windows® 95, a Graphical Device Interface (GDI) is an interface to a graphic system for representing graphical objects and transmitting them to output devices, such as monitors and printers. Another example of a graphics system is X-Window, developed at the Massachusetts Institute of Technology (MIT), and upon which almost all UNIX graphical interfaces, including Motif and OpenLook, are based.

Conventional graphics systems communicate with a pointer driver, for example, a mouse driver, and are informed of any movements of the pointer as well as any button pushes. The graphics system is able to detect which screen control is being targeted so that screen controls can be pre-selected as the pointer moves, for example, to provide roll-over emphasis, and is also responsive to a button push, so that a given task relating to the targeted screen control can be caused to execute. It is therefore the graphics system which determines the screen control which is to respond to a pointer selection.

When a pointer lies within an application window, for example, a CAD drawing or a Freelance presentation, the operation of the application for selecting application controller screen objects is analogous to the operation of graphics sub-system within the operating system. While some application graphic systems do not implement pre-select, ignoring mouse movements, until a button is pushed, they still include means for determining which screen object is being pointed at any given time and as such are easily adapted to incorporate the present invention.

The present invention is based on the assumption that a graphics system, either at the operating system level for handling operating system screen controls or within an application for handling screen objects, can identify the object being pointed to at any given time.

For the purposes of the present description, an object is referred to as targeted during the period that a pointer is pointing at an object, and an object is said to be selectable when a selection event generated by the pointer will select an object.

In the embodiments of the invention described below, an application or operating system graphics system includes a pointer object having a plurality of states. In the preferred embodiment, where the pointer object has three states, the object becomes selectable a pause interval (pi) after it is targeted, and ceases to be selectable a nudge interval (ni) after it ceases to be targeted, FIG. 2(a).

Figure 2A:
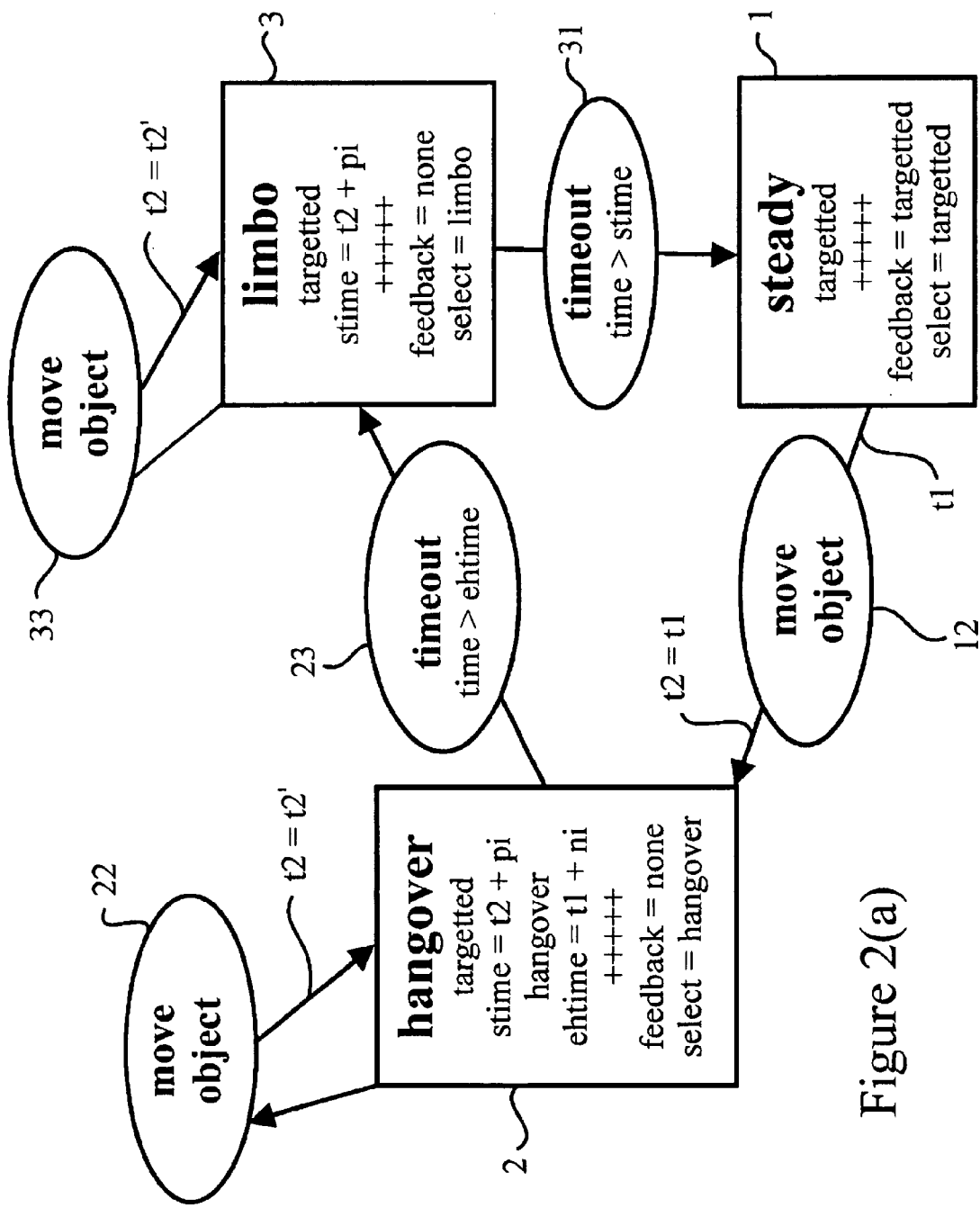
FIGS. 2(a) and 2(b) show state transition diagrams for a pointer according to embodiments of the invention.
Figure 2B:
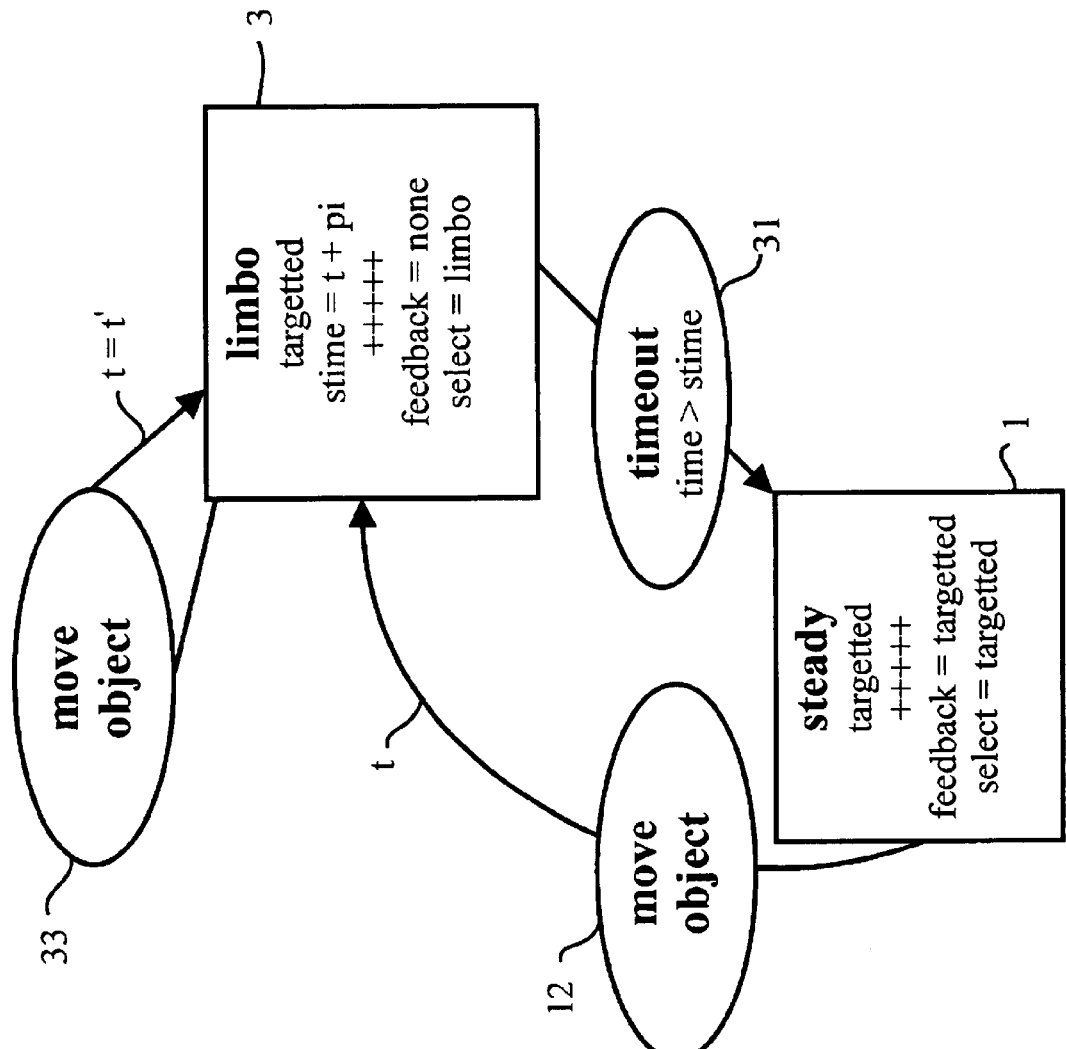

In an alternative embodiment, the pointer object has only two of these states, and an object is only selected if the pointer has continuously been pointing at the same object for more than the threshold pause interval (pi) when the selection (e.g., mouse down) event is registered, FIG. 2(b).

The graphics system can update the state of the pointer object either by responding to every mouse movement and determining the length of time an object has been targeted, or the system can poll the state of the mouse at a frequency greater than 1/ni. The former needs the system clock to be checked as mouse movements occur asynchronously, whereas the latter can use a simple counter, knowing that the polling takes place at a fixed interval.

Alternatively, the invention may be implemented by recording times as the pointer moves from pointing at one object to another, and checking these times when the selection event occurs. Alternatively, the implementation may be based on an interrupt timer restarted each time the pointer moves between objects. This implementation is required if appropriate feedback is to be given when an object becomes selectable.

In any case, it should be seen that both embodiments are based on eliminating "nothing selected" by thinking of the background as being the object selected when no other object is selected. It will be seen, however, that implementations where a state of "nothing selected" is included fall within the scope of the invention.

Figures 1, 3:
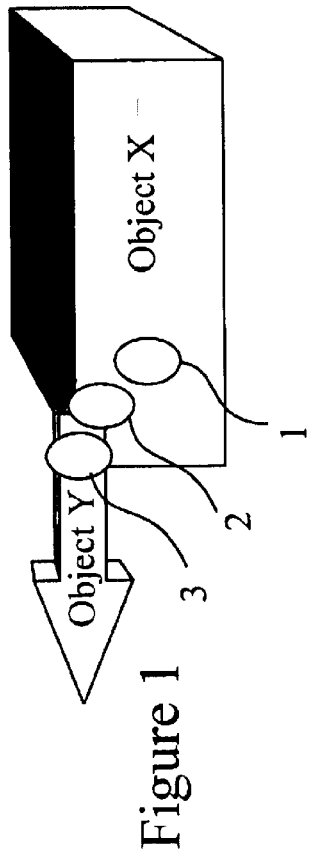
FIG. 1 shows objects to be selected by a pointer driven according to the invention.

The pointer object also includes a plurality of data members, combinations of which are needed in the different states:

targeted: indicates the targeted object as defined above. The method of targeting is within the purview of one skilled in the art.

stime: is equal to the time an object became targeted plus the pause interval (pi) and this is the time the targeted object will become selectable.

hangover: when the pointer moves at time t from an object which has become selectable, hangover stores the identity of this object until time t+ni ehtime: stores the time t+ni Referring to FIG. 1, the three states of the pointer object are:

steady (1): the mouse has targeted an object for a time greater than stime. Any selection event will be recorded against the targeted object and only this data is required in the steady state. It will be seen that time information is not needed in this state as it is only left by changing the targeted object.

hangover (2): the mouse has left a steady state. The previously targeted object becomes the hangover object and any selection event will be recorded against the hangover object. ehtime (end hangover time) indicates the time to exit hangover state and forget the hangover object. stime (selectable time) indicates a time to enter steady state for the newly targeted object X.

limbo (3): the mouse left its last steady state more than ni ago so there is no hangover object. It has not yet been steady on the targeted object for a time pi. Any pointer event will be recorded against a 'limbo' object.

Typically the limbo object will be programmed to beep and ignore the event altogether. Raising events against the limbo object permits the system to implement the basic timing rules, but the programmer must control exactly how the timing rules are used and how to handle this 'error' situation.

It will be seen that the hangover state does not exist in the embodiment of FIG. 2(b). In this embodiment, an object becomes selectable once it has been targeted for a time greater than pi. Thus once the pointer moves from a selectable object, the pointer object changes directly to a limbo state.

Nonetheless, a set of state changes includes:

12: steady->hangover: happens when the mouse target changes away from a steady object in the preferred embodiment, FIG. 2(a).

12': steady->limbo: happens when the mouse target changes away from a steady object in the alternative embodiment, FIG. 2(b).

23: hangover->limbo: happens at interval ni after the system entered hangover state (2). The hangover object is forgotten.

31: limbo->steady: happens at interval pi after an object becomes targeted, assuming the object has remained targeted throughout said interval.

22: hangover->hangover: happens if the mouse target makes a further target change while in hangover state. Hangover details, i.e., hangover object and ehtime, are not effected, but selectable details, i.e., targeted and stime are reset.

33: limbo->limbo: happens if the mouse target makes a further target change while in limbo state. The selectable details (targeted and stime) are reset.

If the system leaves steady state (1) on X at time t1 for hangover state (2) (change 12), the system will move from hangover state (2) at time t1+ni into limbo state (3) (change 23). This is irrespective of how many objects are entered and left between t1 and t1+ni (change 22).

If an object X becomes targeted at time t2 and remains targeted throughout the interval t2 through t2+pi, it will become selectable and the system will enter steady state (1) at stime=t2+pi. If the system is in hangover state (2) at t2, it will enter limbo state (3) at ehtime=t2+ni before it enters steady state (1) at stime=t2+pi. In the current embodiment, the system does not move directly from hangover state (2) to steady state (1).

Typically, a user makes fairly deliberate moves, and the system moves round the main loop of states: 1-2-3-1-2-3-

1-etc. FIG. 3(a), shows the state transitions, steps 101 to 107, when a user moves from Background to X at time t1, and then to Y at time t2, where t2>t1+pi.

FIG. 3(b) gives an example of hangover->hangover and limbo->limbo state transitions. The user moves from steady X, enters Y (step 202 time t1) and leaves very quickly (step 203 time t2<t1+ni) to Z, then a little slower (step 205 time t3, t1+ni<t3<t2+pi) to W, where the mouse rests.

When the move is made from Y to Z at step 203, Y has not yet been targeted long enough to be selectable. It is not therefore relevant to count Y as a hangover object and X remains the hangover object. The move from Y to Z does not effect the time (t1) when X stopped being the selected object and became the hangover object, and thus the time (t1+ni) at which X will cease its hangover status. However, Z is a new object entered at time t2, this timing must be started again and wait until stime=t2+pi before Z can become selectable.

At time t1+ni the hangover status of X ends, step 204, and the pointer object changes to limbo state. This does not effect the time (t2+pi) at which Z, the targeted object, will become selectable.

When the mouse moves from Z to W at step 205, Z has not yet been targeted long enough to be selectable. It is not therefore, relevant to count Z as a hangover object. There remains no hangover object, a move is made from state limbo back to state limbo via state transition path 33. However, W is a new object entered at time t3, so timing will be started again at time t3+pi when W becomes selectable.

Now consider a user who jitters from object X to object Y (time t1) and quickly back (time t2), as presented in FIG. 3(c).

If the user fires an event (e.g., mouse down) during steps 301 or 305 it is recorded against X (steady state 1). The event is also recorded against X if it happens during steps 302 or 303 (hangover state 2). However, the event is recorded against limbo (probably error) if it occurs during step 304.

During step 303 the system has two instances of X within the state. X is the targeted object (and hence will become selectable at step 305) and X is the hangover object (because it was selectable at step 301 and will remain the hangover object until step 304).

In a preferred embodiment the system incorporating the pointer has pre-select feedback. The means for providing such feedback are provided by continuously determining the targeted object. Graphic systems which currently implement pre-select feedback simply highlight the currently targeted object, whereas in the case of the present invention, an object is highlighted once the pointer object enters the steady state and the targeted object becomes selectable.

Feedback can be provided, for example, by highlighting the targeted object (and selectable object), or merely indicating status by changing the pointer icon.

In practice a user is unlikely to intentionally take advantage of the nudge interval while the pointer object is in the hangover state. Thus, there is little point in indicating that an object is selectable if it is no longer targeted; by the time the user has reacted the object may well have ceased to be selectable. If feedback indicates the object as well as the state, only the targeted object and not the selectable object is highlighted.

It will be apparent from the foregoing description that the invention can be implemented within any operating system or general purpose application, for example, within publishing, drawing, presentation, spreadsheet or word processing packages or within dedicated applications, such as those found in personal data assistants. Where there is a need selecting an object from within a screen display it controls.

It will also be seen that, in one embodiment of the present invention, the system determines which screen object is targeted before reading a pointer position, for example, is a system which determines the target object directly from the incidence of the pointer on the object.

Having described preferred embodiments of a method for a graphics system for providing improved pointer selection accuracy, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set for in the appended claims.

What is claimed is:

1. A graphics system for a graphical user interface in which a plurality of screen objects are displayed comprising:
   targeting software module determining a screen object targeted by a pointer; and
   selection software module reading a pointer selection and for selection a screen object;
   said graphic system being characterized by:
      said selection software module selecting a screen object which has been continuously targeted for a predetermined time (pi) and for a predetermined time (ni) after it ceases to be targeted, and
      wherein a control panel is associated with said graphics system, said control panel being responsive to user interaction and updating said predetermined times ni and pi according to said interaction.

2. The graphics system as claimed in claim 1, wherein said targeting software module reads a time at which a screen object becomes targeted.

3. The graphics system as claimed in claim 1, wherein said targeting software module reads a pointer position before determining which object is targeted.

4. The graphics system as claimed in claim 1, wherein said predetermined time ni and pi are stored within said graphics system.

5. The graphics system as claimed in claim 1, wherein said predetermined time pi is greater than said predetermined time ni.

6. A graphics system for a graphical user interface embodied in an operating system in which a plurality of screen objects are displayed comprising:
   targeting software module determining a screen object targeted by a pointer; and
   selection software module reading a pointer selection and for selecting a screen object;
   said graphics system being characterized by:
      said selection software module selecting a screen object which has been continuously targeted for a predetermined time (pi) and for a predetermined time (ni) after it ceases to be targeted, and
      wherein a control panel is associated with the graphics system, the control panel being responsive to user interaction and updating the predetermined times ni and pi according to the interaction.

7. The graphics system of claim 1, embodied in an application wherein said application is one of a general purpose application and a dedicated application.

8. A computer program product comprising computer program code stored on a computer readable storage medium for, when executed on a computing device, controlling the selection of screen objects, the program code comprising a graphical user interface in which a plurality of screen objects are displayed comprising:

targeting software module determining a screen object targeted by a pointer; and selection software module reading a pointer selection and for selection a screen object;

said graphic system being characterized by:

said selection means comprising means for selecting a screen object which has been continuously targeted for a predetermined time (pi), said selection software module selecting a screen object which has been continuously targeted for a predetermined time (pi) and for a predetermined time (ni) after it ceases to be targeted, and wherein a control panel is associated with said graphics system, said control panel being responsive to user interaction and updating said predetermined times ni and pi according to said interaction.

9. A graphics system for a graphical user interface in which a plurality of screen objects are displayed comprising:

targeting means for determining a screen object targeted by a pointer;

selection means for reading a pointer selection and for selecting said screen object; and said graphics system being characterized by:

said selection means comprising means for selecting said screen object which has been continuously targeted for a predetermined time (pi), said selection means comprising means for selecting a screen object which has been continuously targeted for the predetermined time (pi) and for a predetermined time (ni) after it ceases to be targeted, and wherein a control panel is associated with said graphics system, said control panel being responsive to user interaction and updating said predetermined times ni and pi according to said interaction.

\* \* \* \* \*